Oct. 25, 1949.　　　　S. N. JOHNSON　　　　2,485,969
METHOD OF MAKING BRAKE DRUMS

Filed May 21, 1945　　　　　　　　　　　　　6 Sheets-Sheet 1

*INVENTOR.*
STANLEY N. JOHNSON
BY
*Carroll R. Taber*
ATTORNEY.

Oct. 25, 1949.   S. N. JOHNSON   2,485,969
METHOD OF MAKING BRAKE DRUMS
Filed May 21, 1945   6 Sheets-Sheet 2

*INVENTOR.*
STANLEY N. JOHNSON
BY
*Carroll R. Taber*
ATTORNEY

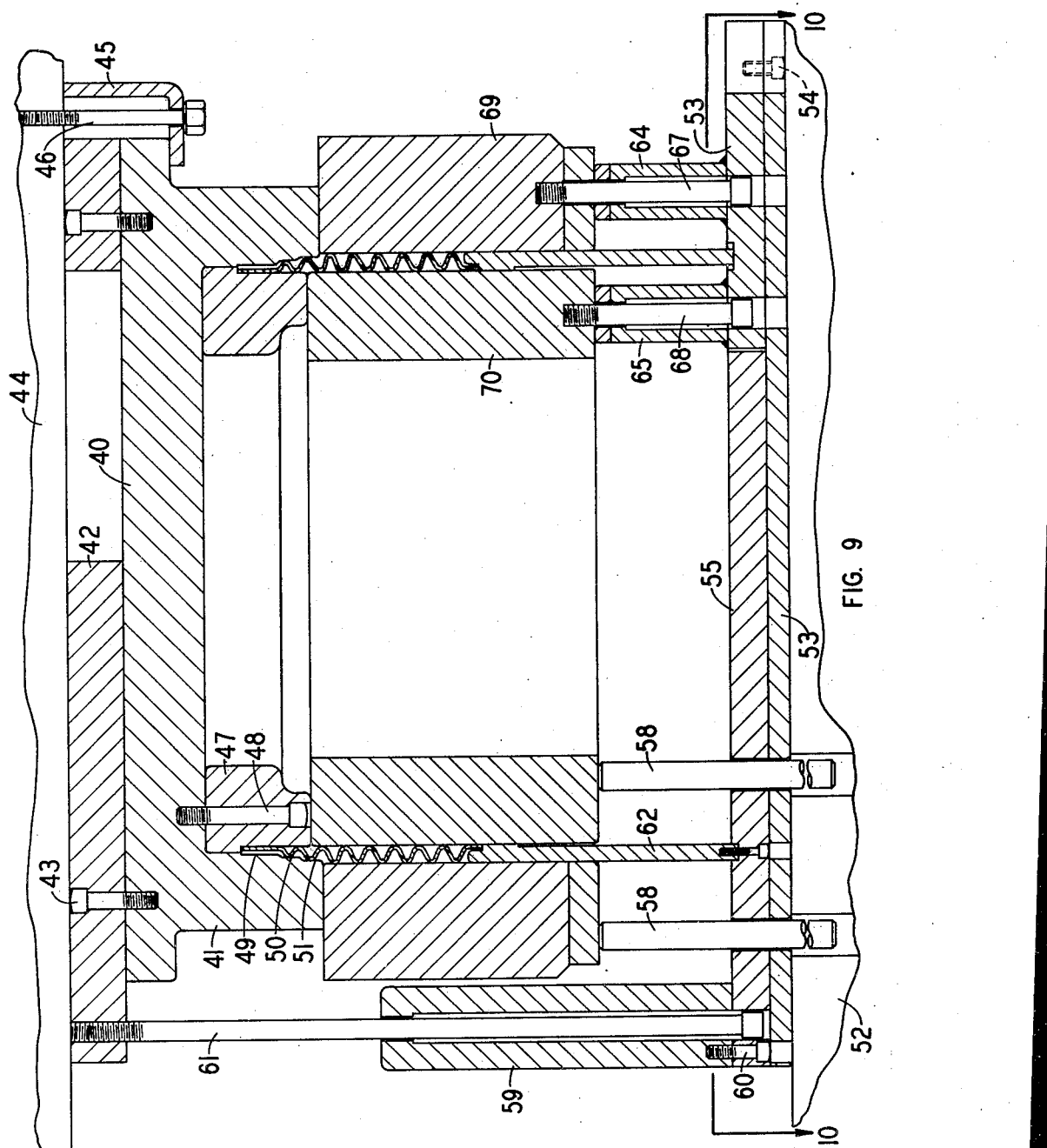

Oct. 25, 1949.  S. N. JOHNSON  2,485,969
METHOD OF MAKING BRAKE DRUMS
Filed May 21, 1945  6 Sheets-Sheet 4

INVENTOR.
STANLEY N. JOHNSON
BY
Carroll R. Taber
ATTORNEY

Oct. 25, 1949.                S. N. JOHNSON                2,485,969
                       METHOD OF MAKING BRAKE DRUMS
Filed May 21, 1945                                    6 Sheets-Sheet 5

INVENTOR.
STANLEY N. JOHNSON
BY
Carroll R. Taber
ATTORNEY

Oct. 25, 1949.  S. N. JOHNSON  2,485,969
METHOD OF MAKING BRAKE DRUMS

Filed May 21, 1945  6 Sheets-Sheet 6

INVENTOR.
STANLEY N. JOHNSON
BY
Carroll R. Faber
ATTORNEY

Patented Oct. 25, 1949

2,485,969

UNITED STATES PATENT OFFICE 2,485,969

METHOD OF MAKING BRAKE DRUMS

Stanley N. Johnson, Lansing, Mich., assignor to Motor Wheel Corporation, Lansing, Mich., a corporation of Michigan Application May 21, 1945, Serial No. 595,041

4 Claims. (Cl. 153—73)

This invention relates to brake drums and more particularly to methods of manufacturing such drums.

Heretofore in the manufacture of brake drum rings, particularly drum rings which are provided with radial ribs for stiffening and heat radiation, it has been the practice to form the ribs entirely by rolling operations. This is satisfactory in certain types of brake rings, but in brake rings of relatively small diameters, or brake rings provided with a plurality of parallel ribs, or both, these rolling operations tend to reduce the thickness of the metal in the brake ring shell.

The principal object of the present invention is to provide a method of making a brake ring in which a plurality of ribs are formed, and in which the thickness of the shell is not subject to any appreciable reduction.

Another object of the present invention is to provide a method of making a brake ring in which the ribs in the shell are formed by collapsing the shell axially to form the ribs.

A still further object of the invention is to provide such a method in which the ribs in the shell are formed by collapsing the ring axially and in which the ribs are formed successively from one axial extremity of the rib to the other.

These objects are attained in part by first providing a substantially cylindrical sheet metal hoop, subsequently deforming the ring slightly in spaced parallel zones in such a manner that resistance to axial collapsing of the ring increases progressively from one end of the ring to the other, and finally collapsing the ring by pressure applied at the axial extremities of the ring.

These objects will more fully appear in the following specification and accompanying drawings, wherein—

Figure 9 is a cross-sectional view of a die employed for collapsing the brake ring axially and taken on substantially the line 9—9 of Figure 11;

Figure 1:
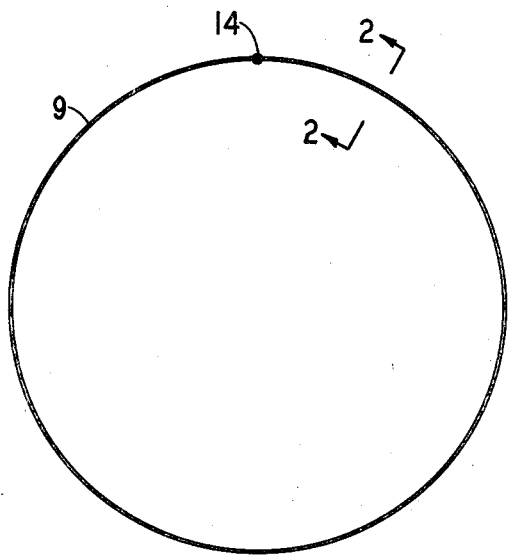
Figure 1 is an end elevational view of a sheet metal hoop from which the brake drum ring is formed.
Figure 2:
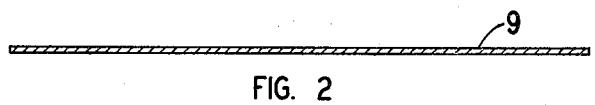
Figures 2 to 6 are cross-sectional views taken on substantially the line 2—2 of Figure 1, showing the brake ring in various stages of its formation.

Referring now more in detail to the drawings, and especially to Figures 1 to 7 thereof, the numeral 10 designates a brake ring which has been fashioned by the method of the present invention. The brake ring comprises a steel shell 11 having a radial flange 12 at one axial extremity thereof to which a brake back is to be attached, as is conventional practice. The shell is provided with a plurality of parallel ribs designated A to H. The shell is lined with a cast iron lining 13 which preferably is centrifugally cast into the shell in a manner well known in the art. It will be noted that in the specific brake ring disclosed ribs A to F are all of the same height while ribs G and H are of slightly reduced height. This is merely a design feature of the specific ring disclosed and it will be evident as the description of the invention proceeds that the ribs may all be of the same height if desired, or may increase in height progressively from one end of the ring to the other.

The steps of forming the ring are disclosed in Figures 1 to 6. The first step in forming the ring is to form a substantially cylindrical hoop 9 of sheet steel by bending a flat blank into cylindrical form and welding the extremities together as at 14. The cross-section of the hoop when thus formed is disclosed in Figure 2.

Figure 3:
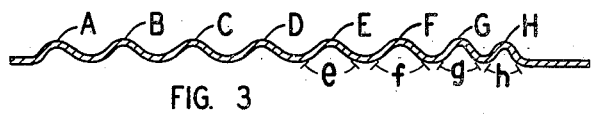
Figure 8:
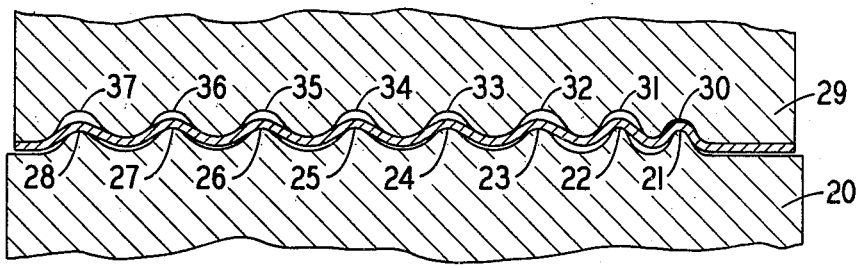
Figure 8 is a fragmentary cross-sectional view showing adjacent portions of two rolls employed in the first rolling operation.

The hoop is then placed between a pair of rolls which are shown in Figure 8 and which will be more fully described presently, and rolled to the configuration shown in Figure 3. This rolling operation forms a plurality of parallel, relatively shallow ribs A to H thereon. The depth of the ribs is such that there is no appreciable stretching or flowing of the metal during the rolling process. The sole purpose of this particular rolling operation is to start the formation of each rib and at the same time progressively reduce the resistance of the ribs to collapsing from one axial extremity to the other. It will be noted that the angle $h$ between the side walls of the rib H is relatively acute. The angle $g$ between the walls of the rib G is slightly more obtuse than angle $h$. Angle $f$ between the walls of rib F is still more obtuse, and so on through the ribs E to A. By thus forming the shallow ribs in the hoop the ribs will collapse progressively when axial pressure is applied to form the ribs to their final shape as disclosed in Figure 4.

Figure 10:
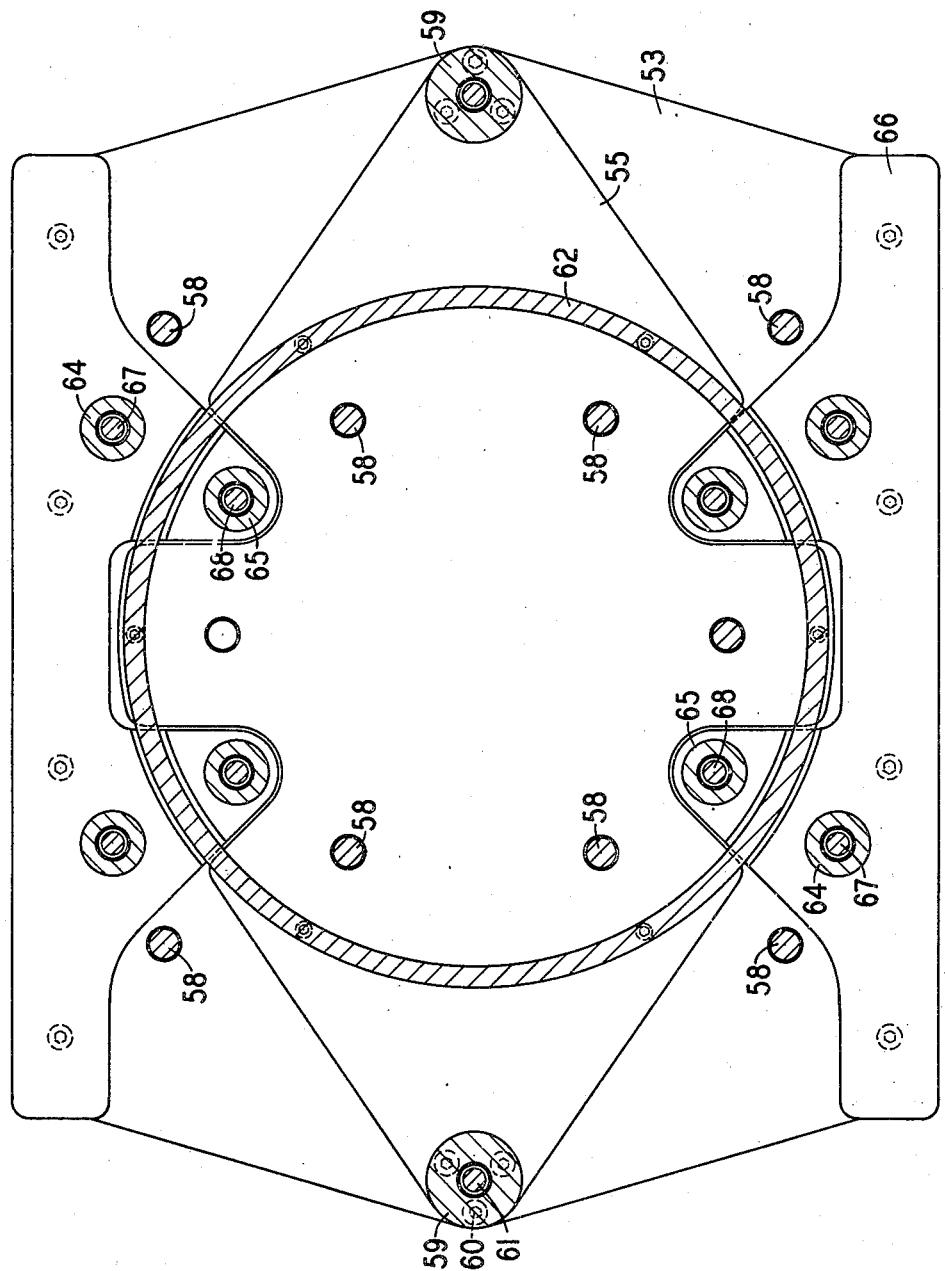
Figure 10 is a cross-sectional view taken on substantially the line 10—10 of Figure 9.
Figure 11:
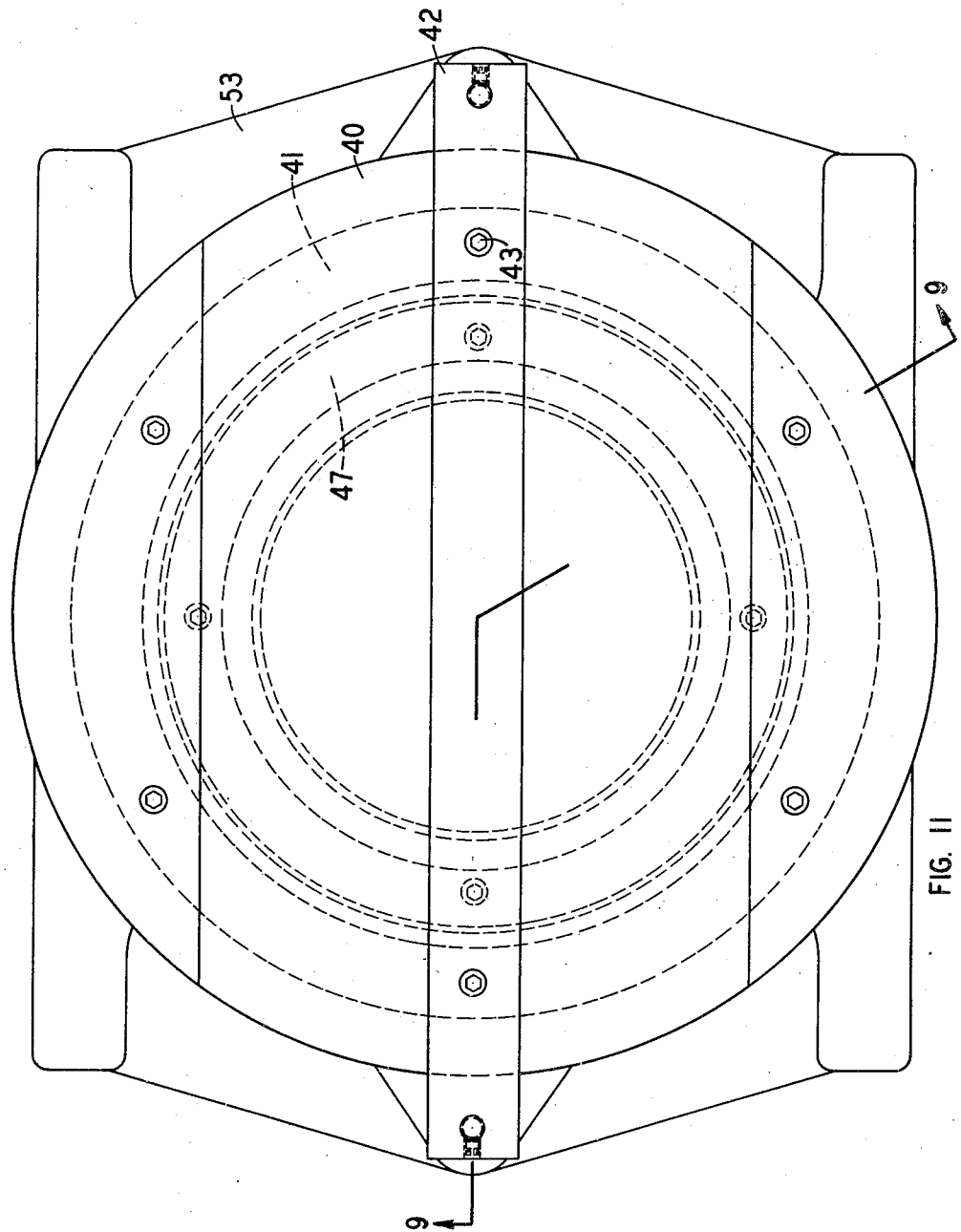
Figure 11 is a plan view of the die.

The hoop of Figure 3 is then placed in the die disclosed in Figures 9 to 11 and axial pressure is applied to the axial extremities of the hoop. The hoop is collapsed into the shape shown in Figure 4. During this process rib H collapses to its final form before any appreciable collapsing of rib G occurs. Rib G collapses before any appreciable collapsing of rib F occurs, and so on progressively through the ribs E to A. The collapsing of each rib is limited by the side walls of the die in which the hoop is placed, as will be more apparent when the operation of the die is disclosed.

Figure 5:
Figure 16:
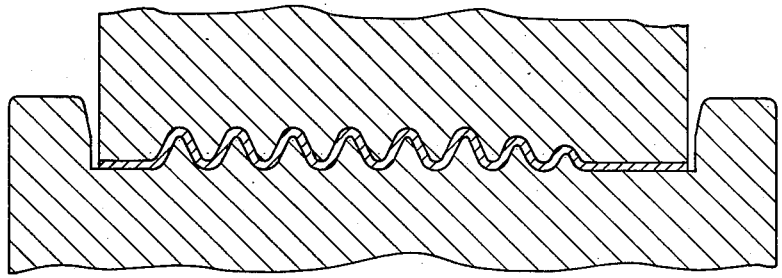
Figure 16 is a fragmentary cross-sectional view showing portions of the rolls employed for truing the ribs on the ring.

After the hoop has been collapsed it is subjected to a second rolling operation in a pair of rolls shown in Figure 16. This rolling operation removes any slight deformities in the ribs but does not appreciably change the cross-sectional shape of the hoop. The cross section of the hoop after this operation is completed is shown in Figure 5.

Figure 6:
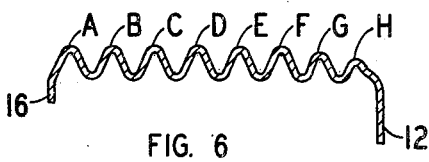
Figure 7:
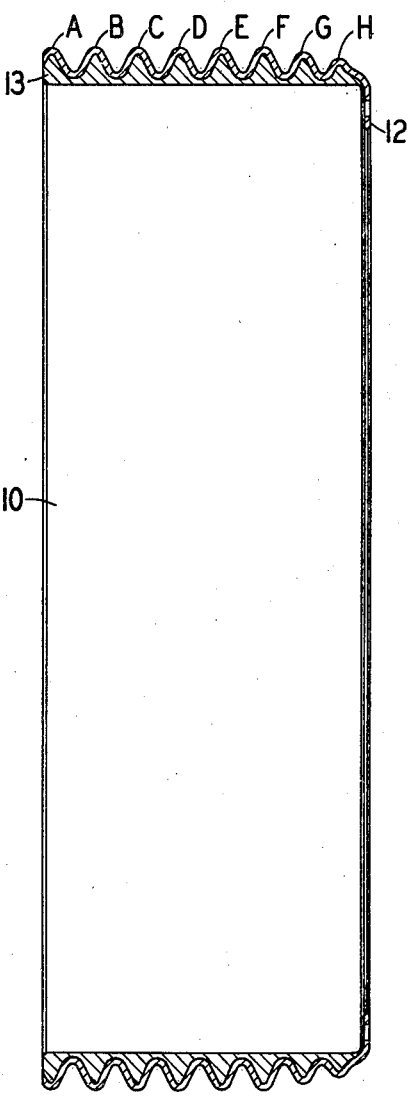
Figure 7 is a half sectional view of the completed brake ring.

The next step in forming the ring is another rolling operation. The hoop is placed in a third set of rolls and the axial extremities of the hoop are turned over to form radial flanges 12 and 16 at the extremities of the hoop. Flange 12 becomes the attaching flange for the brake back. Both flanges 12 and 16 act as dams to hold molten cast iron when it is centrifugally cast into the shell. The cross section of the hoop after this operation is completed is shown in Figure 6.

The shell is then placed in a conventional casting machine and the cast iron lining 13 is cast into the ring. After the lining has cooled the flange 16 is preferably machined away. The inside of the lining is also machined to provide the finished brake ring shown in Fig. 7.

The rolls which are employed for forming the shallow ribs, as disclosed in Figure 3, are shown in part in Figure 8. Only part of each roll is shown, but it will be understood that the two rolls are mounted on rotatable shafts on a conventional rolling machine. The inner roll designated by the numeral 20 has formed thereon a plurality of parallel ribs, 21 to 28 inclusive, of the shape shown in Figure 8. The spacing of these ribs is such that they will properly locate the ribs A to H in the hoop 10 when it is first rolled. Due to the fact that the ribs G and H are of somewhat less diameter in finished form than the other ribs of the ring, the two ribs 21 and 22 on the roll 20 are of slightly less diameter than the other ribs, rib 21 being the lowest. Each of the ribs 23 to 28 on the roll 28 decreases progressively in diameter from the rib 23 to the rib 28. The difference in diameter is relatively small, being but .010 inch between each two adjacent ribs. Also, it will be noted that the ribs 21 and 22 are somewhat sharper than the other ribs. In other words, the sides of the ribs form more acute angles than the sides of the other ribs on the roll.

The outer roll 29 is also provided with a plurality of grooves 30 to 37 which cooperate with the corresponding ribs 21 to 28 on the inner roll 20 so that when the two rolls are brought together the hoop, which is placed between them, is rolled into proper shape. In between the grooves 30 to 37 are a plurality of ribs, all of which may be of the same height, if desired.

Figure 4:

The die in which the hoop is collapsed into the form disclosed in Figure 4 is shown in Figures 9 to 11. The die comprises a plate 40 having an annular flange 41 depending therefrom. Bolted to the top of the plate 40 is a bar 42. The bar 42 is secured to the plate 40 by bolts 43. The plate 40 and the bar 42 are secured to a ram 44 of a mechanical press by brackets 45 and bolts 46. The brackets have inturned flanges which engage beneath the plate 40, as illustrated in Figure 9.

Inside the flange 41 of the plate 40 is an annular ring 47 of the cross-section shown in Figure 9. The ring 47 is bolted to the plate 40 by bolts 48. It will be noted that there is a narrow space 49 between the flange 41 and the ring 47 to receive the upper axial extremity of the brake ring hoop, as will be more apparent later. The inner periphery of the flange 41 is provided with two offsets 50 and 51, the purpose of which will appear presently.

Mounted on the bed of the press, which is indicated by the numeral 52, is a bottom plate 53. The bottom plate is secured to the bed of the press by suitable bolts. A plate 55 of the shape shown in Figure 10 is securely fastened to the ring 62. The plate 55 is capable of vertical movement relative to plate 53. Both plates 53 and 55 are provided with apertures 56 for the reception of bars 58 which extend upwardly through the bed of the press. The lower ends of the bars 58 contact a pressure plate, not shown, which is continuously biased upwardly by pneumatic pressure.

A pair of sleeves 59 are attached to the plate 55 at opposite ends thereof by bolts 60. The sleeves are provided with restricted openings in the upper ends thereof which slidably receive stripper bolts 61 which are rigidly fastened to the bar 42 on the ram of the press.

A plurality of sleeves 64 and 65 are welded or otherwise secured to plate 53 which is fastened to the bed of the press. The sleeves 64 and 65 receive stop bolts 67 and 68 respectively which are attached to two annular rings 69 and 70. The two rings 69 and 70 are spaced apart a distance equal to the height of the finished ribs on the hoop from which the brake ring is formed. The space between the rings 69 and 70 receives the ring 62.

Figure 13:
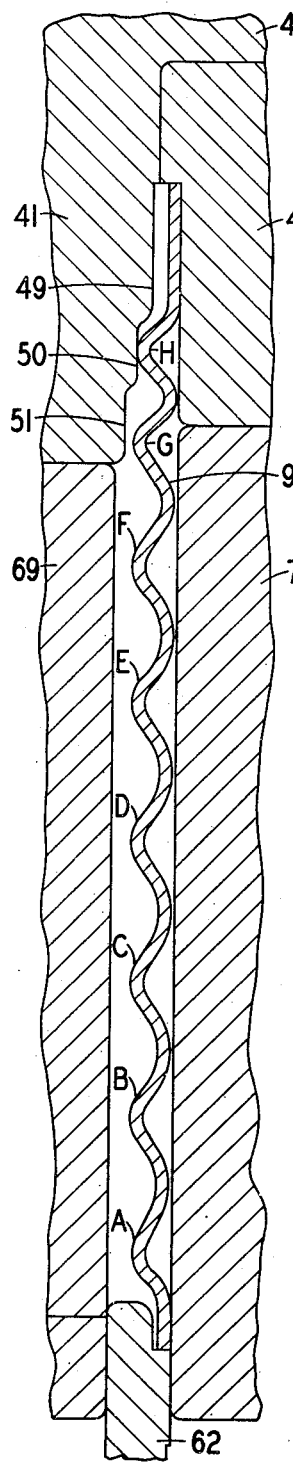
Figure 13 is a fragmentary cross-sectional view of the die with the die closed.
Figure 12:
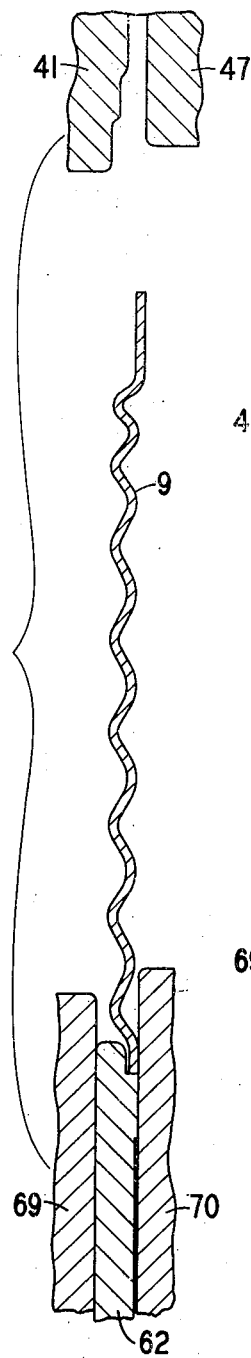
Figure 12 is a fragmentary cross-sectional view showing portions of the die with the die open and the ring in place therein.

Figures 12 to 15 disclose the important parts of the die during the different phases of the operation thereof. Figure 12 discloses the parts 41, 47, 62, 69 and 70 when the top portion of the die is retracted. The hoop 10 with the partially formed shallow ribs thereon is inserted into the die with the lower axial extremity thereof resting in a groove in the top of the ring 62. The ram 44 of the press is then set in motion. The ram moves downwardly carrying with it the rings 40 and 47 and the stripper bolts 61. The sleeves 59, the plate 55, and the rings 62 are also permitted to lower until the plate 55 contacts the plate 53 on the bed of the press. The rings 69 and 70 are held in the position shown in Figure 12 and Figure 9 by means of the bars 58, thereby permitting the hoop 10 to drop between the rings 69 and 70 as illustrated in Figure 13. The ring 47 and the flange 41 engage over the upper axial extremity of the hoop 10 and also contact the rings 69 and 70. The parts are then in the position shown in Figure 13 with the hoop entirely enclosed within the die.

Figures 14, 15:
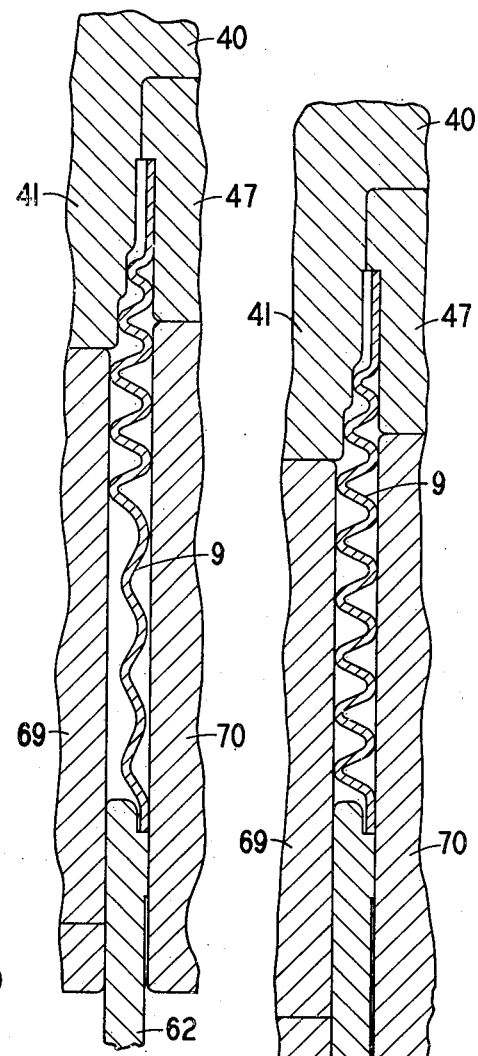
Figure 14 is a fragmentary cross-sectional view similar to Figure 13 showing the brake ring partially collapsed.
Figure 15 is a fragmentary cross-sectional view similar to Figures 13 and 14 showing the brake ring completely collapsed.

Further downward movement of the ram pushes the upper extremity of the hoop 10 downwardly as well as the rings 69 and 70, the latter moving against the rods 58 which are biased upwardly by pneumatic pressure. Since the lower axial extremity of the hoop 10 is held rigidly with respect to the bed of the press by means of the ring 13 the hoop must begin to collapse and this occurs as illustrated in Figure 14. Due to the particular configuration of the hoop at the start of the pressing or collapsing operation, the first rib H at the top of the hoop is collapsed first and no collapsing of any of the other ribs takes place until the radially outer surface of the rib H strikes the offset 50 on the inner surface of the flange 41. Further collapsing of the rib H is thus prevented and rib G then begins to collapse. As soon as the rib G strikes the offset 51 further collapsing of that rib is prevented and rib F collapses. This is repeated in sequence for each rib as the press continues its downward movement until all of the ribs are collapsed, as shown in Figure 15. The collapsing of each rib is terminated by the radially outer and inner surfaces of the rib striking the opposing walls of the parts 41, 47, 69 and 70.

As soon as the hoop takes the shape shown in Figure 15 the ram of the die is moved upward, lifting the ring 40 and the ring 47 away from the hoop. The stripper bolts 61 then pick up the sleeves 59 and the attached plate 55 and raise the hoop out of the space between the rings 69 and 70 by means of the ring 62.

After the hoop has been formed in the die as above described, it is placed between a set of rolls shown in partial cross-section in Figure 16 and any deformities in the ribs are removed. The rolls are conventional except for the peculiar formation of the exterior surfaces thereof and the cross-section of these surfaces is clearly illustrated in Figure 16.

Figure 17:
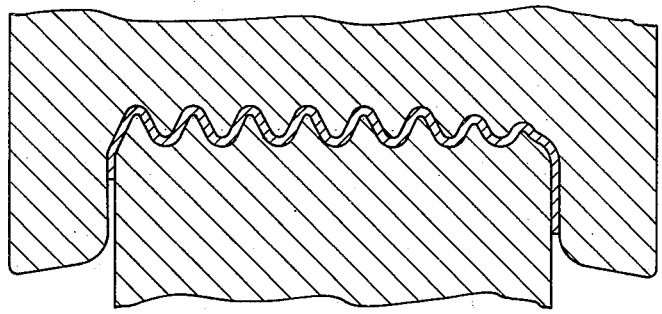
Figure 17 is a fragmentary cross-sectional view showing portions of the finished rolls.

The hoop is removed from between the rolls shown in Figure 16 and placed between still another set of rolls shown in Figure 17 which are so formed that they turn over the axial extremities of the hoop to form the flanges 12 and 16 above described.

After the last rolling operation the hoop is provided with a cast iron liner by centrifugally casting molten metal therein, as is conventional practice. Finally the flange 16 is machined away and the inner surface of the cast iron lining is also machined.

From the foregoing it will be seen that the present invention provides a method of making brake drum rings having a plurality of ribs which is entirely different from any previous method. There is no appreciable reduction in the thickness of the stock of the hoop during the initial rolling operation shown in Figures 3 and 8. All that this rolling operation does is provide axially spaced apart zones of varying resistance to axial collapsing so that when an axial force is applied to the hoop the ribs collapse progressively from one extremity of the hoop to the other.

Furthermore, by successively weakening, as it were, the various axially spaced zones in the hoop and thereby causing the ribs to collapse progressively, there will be no possibility of the hoop sticking in the collapsing die. If all of the ribs have the same relative resistance to collapsing when placed in the die they will all collapse together and will jam against the side walls of the die before the ram has completed its downward movement. When that occurs the uncollapsed portion of the hoop cannot move relative to the die and some of the ribs may be collapsed still further while others remain relatively untouched and the hoop will "freeze" to the die.

The scope of the invention is indicated in the append claims.

I claim:

1. The method of making a brake ring from a substantially cylindrical sheet metal hoop comprising the steps of forming in said hoop a plurality of hollow parallel circumferential ribs with the depth of each rib substantially uniform throughout its circumference and with the depths of said ribs decreasing in order from one end of the hoop to the other, thereafter applying axial pressure to said hoop and simultaneously confining the hoop between a predetermined internal diameter and a predetermined external diameter to partially collapse said ribs in order from the deepest to the shallowest rib.

2. The method of making a brake ring from a substantially cylindrical sheet metal hoop comprising the steps of forming in said hoop a plurality of hollow parallel circumferential ribs with the included angles between the walls of said ribs increasing in order from one end of the hoop to the other, thereafter applying axial pressure to said hoop and simultaneously confining the hoop within predetermined internal and external diameters to partially collapse said ribs in order from the rib having the smallest included angle to the rib having the greatest included angle.

3. The method of making a brake ring from a substantially cylindrical sheet metal hoop comprising the steps of forming in said hoop a plurality of hollow parallel circumferential ribs with the depth of each rib substantially uniform throughout its circumference and with the depths of said ribs decreasing in order from one end of the hoop to the other and with the included angles between the walls of said ribs increasing in like order from one end of the hoop to the other, thereafter applying axial pressure to said hoop and simultaneously confining the hoop within predetermined internal and external diameters to thereby partially collapse said ribs successively in order from the deepest to the shallowest rib to substantially the same internal and external diameters.

4. The method of making a brake ring from a substantially cylindrical sheet metal hoop comprising the steps of forming in said hoop a plurality of hollow parallel circumferential ribs with the depth of each rib substantially uniform throughout its circumference and with the depths of said ribs decreasing in order from one end of the hoop to the other, thereafter confining said ribbed hoop between concentric cylindrical walls of different diameters to provide a clearance therebetween greater than the depth of any of the above said ribs and substantially equal to the final depth of said ribs in their partially collapsed condition produced by the following step, and thereafter applying axial pressure to said ribbed hoop while thus confined to partially collapse said ribs to a depth equal to the radial clearance between asid cylindrical walls, said collapsing of said ribs proceeding in order from the deepest rib to the shallowest rib.

STANLEY N. JOHNSON.

REFERENCES CITED

The following references are of record in the file of this patent:

UNITED STATES PATENTS

| Number | Name | Date |
| --- | --- | --- |
| 606,786 | Kemp | July 5, 1898 |
| 1,484,141 | Mallory | Feb. 19, 1924 |
| 1,486,976 | Lindgren | Mar. 18, 1924 |
| 1,907,914 | Ward | May 9, 1933 |
| 1,980,264 | Geisler | Nov. 13, 1934 |
| 2,082,199 | Dake | June 1, 1937 |
| 2,112,697 | Van Halteren | Mar. 29, 1938 |
| 2,153,173 | Campbell | Apr. 4, 1939 |
| 2,316,029 | Gressel et al. | Apr. 16, 1943 |